United States Patent
Wang et al.

(10) Patent No.: US 11,172,491 B2
(45) Date of Patent: Nov. 9, 2021

(54) DATA TRANSMISSION METHOD, APPARATUS AND SYSTEM, NETWORK ELEMENT, STORAGE MEDIUM AND PROCESSOR

(71) Applicant: ZTE CORPORATION, Shenzhen (CN)

(72) Inventors: Xin Wang, Shenzhen (CN); Zijiang Ma, Shenzhen (CN); He Huang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 15 days.

(21) Appl. No.: 16/626,135

(22) PCT Filed: May 24, 2018

(86) PCT No.: PCT/CN2018/088281
§ 371 (c)(1),
(2) Date: Dec. 23, 2019

(87) PCT Pub. No.: WO2018/233446
PCT Pub. Date: Dec. 27, 2018

(65) Prior Publication Data
US 2021/0153218 A1    May 20, 2021

(30) Foreign Application Priority Data

Jun. 23, 2017    (CN) .......................... 201710487484.0

(51) Int. Cl.
*H04W 72/08* (2009.01)
*H04W 76/15* (2018.01)
(Continued)

(52) U.S. Cl.
CPC ..... *H04W 72/087* (2013.01); *H04W 28/0252* (2013.01); *H04W 76/15* (2018.02); *H04W 80/02* (2013.01); *H04W 88/06* (2013.01)

(58) Field of Classification Search
CPC .............. H04W 72/087; H04W 76/15; H04W 28/0252; H04W 80/02; H04W 88/06
See application file for complete search history.

(56) References Cited

U.S. PATENT DOCUMENTS

| | | | |
|---|---|---|---|
| 2013/0176988 A1* | 7/2013 | Wang .................... | H04L 5/0053 370/331 |
| 2015/0244429 A1* | 8/2015 | Zhang .................... | H04B 7/024 370/329 |

(Continued)

FOREIGN PATENT DOCUMENTS

| | | |
|---|---|---|
| CN | 102378181 A | 3/2012 |
| CN | 106341864 A | 1/2017 |

(Continued)

OTHER PUBLICATIONS

International Search Report and Written Opinion Form PCT/ISA/210 and PCT/ISA237, International Application No. PCT/CN2018/088281, pp. 1-7, International Filing Date May 24, 2018, dated Jul. 31, 2018.

*Primary Examiner* — Mazda Sabouri
(74) *Attorney, Agent, or Firm* — Bond Schoeneck & King, PLLC; George McGuire

(57) ABSTRACT

Disclosed are a data transmission method, apparatus and system, a network element, a storage medium and a processor. The system includes a first network element and a second network element. The first network element is configured with an anchor link of a radio bearer for a terminal, and the second network element is configured with a first secondary link and a second secondary link of the radio bearer; where the anchor link includes a packet data con- (Continued)

vergence protocol (PDCP) entity and a first radio link control (RLC) entity, the first secondary link includes a second RLC entity, and the second secondary link includes a third RLC entity; and where a data transmission is performed between the PDCP entity and the first RLC entity, the second RLC entity and the third RLC entity.

18 Claims, 4 Drawing Sheets

(51) Int. Cl.
    *H04W 28/02*     (2009.01)
    *H04W 80/02*     (2009.01)
    *H04W 88/06*     (2009.01)

(56) References Cited

U.S. PATENT DOCUMENTS

2017/0012887 A1*   1/2017   Ohta .................. H04L 1/1614
2018/0191479 A1*   7/2018   Baek .................. H04L 1/1841
2018/0270700 A1*   9/2018   Babaei ............ H04W 72/1284

FOREIGN PATENT DOCUMENTS

CN         106559916 A     4/2017
EP          3059997 A1     8/2016

* cited by examiner

DATA TRANSMISSION METHOD, APPARATUS AND SYSTEM, NETWORK ELEMENT, STORAGE MEDIUM AND PROCESSOR

CROSS-REFERENCE TO RELATED APPLICATION

This application is a national stage application under 35 U.S.C. 371 based on international patent application PCT/CN2018/088281, filed on May 24, 2018, which claims priority to a Chinese patent application No. 201710487484.0 filed on Jun. 23, 2017, disclosures of both of which are incorporated herein by reference in their entireties.

TECHNICAL FIELD

The present disclosure relates to the field of communications and, in particular, to a data transmission method, apparatus and system, a network element, a storage medium and a processor.

BACKGROUND

Current communication networks include the widely-deployed fourth generation (4G) communication system and the initially-deployed fifth generation (5G) communication system. A core network of the 4G system is an evolved packet core (EPC) network, and a radio access network (RAN) of the 4G system is deployed with an evolved node B (eNB) whose wireless interface uses evolved universal terrestrial radio access (E-UTRA). A core network of the 5G system is a next generation core network (NG-CN), and a RAN of the 5G system is deployed with a generation node B (gNB) whose wireless interface uses new radio (NR) access and an evolved long term evolution (eLTE) base station.

In an access network, an architectural mode in which two base stations are tightly coupled to provide a communication service for a user equipment (UE) is referred to as dual connectivity (DC). FIG. 1 is a schematic diagram illustrating a dual connectivity architecture in the related art. As shown in FIG. 1, in the DC architecture, a base station that establishes a control plane (CP) interface for the UE with the core network is referred to as a master node (MN), which may also be referred to as a first network element, the other base station that only provides additional radio resources for the UE is referred to as a secondary node (SN), which may also be referred to as a second network element. At least one of the first network element and the second network element establishes a user plane (UP) interface for the UE with the core network, and the first network element and the second network element are generally connected through a non-ideal wired interface (referred to as an X2 or Xn interface). For the wireless interface, the first network element and the second network element may use the same radio access technology or different radio access technologies.

From the perspective of a UP radio protocol stack, a complete Layer 2 (L2) protocol stack of a radio bearer (RB) includes a packet data convergence protocol (PDCP) entity, a radio link control (RLC) entity and a medium access control (MAC) entity. If currently the UE accesses the NG-CN, the L2 protocol stack further includes a new access stratum (AS) entity located above the PDCP entity.

In the related art, multiple bearer modes are designed on the user plane due to various traffic requirements and complex and variable channel environments in the communication network. However, currently no effective solution has been provided for the problem of how to effectively coordinate and configure the multiple bearer modes to achieve reasonable coexistence and provide good communication services for the UE.

SUMMARY

In view of this, embodiments of the present disclosure provide a data transmission method, apparatus and system, a network element, a storage medium and a processor, to solve at least the problem in the related art of an inability of a dual connectivity architecture to satisfy a quality of service (QoS) requirement of a terminal.

The embodiments of the present disclosure provide a data transmission system including a first network element and a second network element. The first network element is configured with an anchor link of a radio bearer for a terminal, and the second network element is configured with a first secondary link and a second secondary link of the radio bearer. The anchor link includes a PDCP entity and a first RLC entity, the first secondary link includes a second RLC entity, and the second secondary link includes a third RLC entity, where a data transmission is performed between the PDCP entity and the first RLC entity, the second RLC entity and the third RLC entity.

In the above solution, in response to determining that first data is transmitted between the PDCP entity and the first RLC entity, second data is transmitted between the PDCP entity and the second RLC entity, and third data is transmitted between the PDCP entity and the third RLC entity; where the second data is different from the first data, and the third data is the same as the first data; or the second data is the same as the first data, and the third data is different from the first data.

In the above solution, the first network element is further configured with a third secondary link, where the third secondary link includes a fourth RLC entity; where fourth data is transmitted between the PDCP entity and the fourth RLC entity, and the fourth data is the same as data transmitted between the PDCP entity and the first RLC entity.

The embodiments of the present disclosure further provide a data transmission method. The method includes that a first network element sends a request message to a second network element, where the request message is used for requesting that a first secondary link be established for a radio bearer of a terminal. The first network element has been configured with an anchor link of the radio bearer, and the second network element has been configured with a second secondary link of the radio bearer. The anchor link includes a PDCP entity and a first RLC entity, the first secondary link includes a second RLC entity, and the second secondary link includes a third RLC entity, where a data transmission is performed between the PDCP entity and one of the first RLC entity, the second RLC entity or the third RLC entity.

In the above solution, in response to determining that first data is transmitted between the PDCP entity and the first RLC entity, second data is transmitted between the PDCP entity and the second RLC entity, and third data is transmitted between the PDCP entity and the third RLC entity; where the second data is different from the first data, and the third data is the same as the first data; or the second data is the same as the first data, and the third data is different from the first data.

In the above solution, the request message carries following information: an identifier of the terminal, an identifier of the radio bearer, or an architectural mode of the first secondary link.

In the above solution, the request message further carries at least one of: a measurement result of the first network element on a cell of the second network element, quality of service (QoS) information of the radio bearer, an operation mode of the first secondary link, or a transport layer address and a port identifier which are assigned by the first network element for an interface transport tunnel between the first network element and the second network element.

In the above solution, after the first network element sends the request information used for requesting that the first secondary link be established for the radio bearer of the terminal to the second network element, the method further includes that the first network element receives a response message corresponding to the request message and returned by the second network element. The response message is used for indicating that the request message is accepted or rejected; where in response to determining that the response message indicates that the request message is accepted, the response message carries radio resource configuration information for the first secondary link; and in response to determining that the response message indicates that the request message is rejected, the response message carries information for indicating that establishing the first secondary link is rejected.

In the above solution, in response to determining that the response message indicates that the request message is accepted, after the first network element receives the response message corresponding to the request message and returned by the second network element, the method further includes steps described below. The first network element encapsulates the radio resource configuration information and generates radio resource control (RRC) signaling toward the terminal. The first network element sends the generated RRC signaling to the terminal.

In the above solution, before the first network element sends the request information used for requesting that the first secondary link be established for the radio bearer of the terminal to the second network element, the method further includes one of steps described below. The first network element determines that the first secondary link needs to be established in the second network element for the radio bearer according to a current requirement of a network side and/or radio channel condition information. The first network element receives a first message sent by the second network element, where the first message indicates that the first network element needs to establish the first secondary link in the second network element for the radio bearer.

In the above solution, the first message carries at least one of: information of a cell corresponding to the first secondary link, where the information of the cell includes identifier information of the cell and frequency point information of the cell.

In the above solution, after the first network element receives the first message sent by the second network element, the method further includes that the first network element determines, according to the first message, that establishing the first secondary link is accepted or rejected.

In the above solution, the step in which the first network element sends the request message used for requesting that the first secondary link be established for the radio bearer of the terminal to the second network element includes a step described below. In response to determining by the first network element that the establishing the first secondary link is accepted and in response to determining that the first message does not carry radio resource configuration information for the first secondary link, the first network element sends the request message to the second network element, where the request message is further used for requesting the radio resource configuration information for the first secondary link.

In the above solution, in response to determining by the first network element that the establishing the first secondary link is accepted and in response to determining that the first message carries radio resource configuration information for the first secondary link, the method further includes steps described below. The first network element does not send the request message to the second network element, encapsulates the radio resource configuration information directly and generates RRC signaling toward the terminal, and sends the generated RRC signaling to the terminal.

In the above solution, in response to determining that the second network element has been configured with the first secondary link, the method further includes steps described below. The first network element receives indication information sent by the second network element, where the indication information indicates to deactivate a specified secondary link; and where the specified secondary link includes the first secondary link or the second secondary link. In response to determining by the first network element that deactivating the specified secondary link is accepted, the first network element suspends or closes a data processing function of the PDCP entity corresponding to the specified secondary link.

In the above solution, in response to determining by the first network element that deactivating the specified secondary link is rejected, the first network sends rejection information indicating that the first network element rejects deactivating the specified secondary link to the second network element.

In the above solution, before the first network element receives the first message sent by the second network element, the method further includes that the second network element determines that the first secondary link needs to be established in the second network element for the radio bearer.

In the above solution, the step in which the second network element determines that the first secondary link needs to be established in the second network element for the radio bearer includes a step described below. The second network element determines that the first secondary link needs to be established in the second network element for the radio bearer according to at least one of following information: current radio channel information between the second network element and the terminal, radio resource information of the second network element or information carried in a received second network element addition request message sent by the first network element.

In the above solution, the first network element sends the request message used for requesting that the first secondary link be established for the radio bearer of the terminal to the second network element in one of the following processes: a process of providing context information of the terminal for the second network element, a process for modifying the context information of the terminal on the second network element, or a process for converting a role of the second network element.

The embodiments of the present disclosure further provide a data transmission apparatus including a sending module. The sending module is configured to send a request message to a second network element, where the request message is used for requesting that a first secondary link be established for a radio bearer of a terminal. A first network element has been configured with an anchor link of the radio bearer, and the second network element has been configured with a second secondary link of the radio bearer. The anchor link includes a PDCP entity and a first RLC entity, the first secondary link includes a second RLC entity, and the second secondary link comprises a third RLC entity; and a data transmission is performed between the PDCP entity and the first RLC entity, the second RLC entity and the third RLC entity.

In the above solution, in response to determining that first data is transmitted between the PDCP entity and the first RLC entity, second data is transmitted between the PDCP entity and the second RLC entity, and third data is transmitted between the PDCP entity and the third RLC entity; where the second data is different from the first data, and the third data is the same as the first data; or the second data is the same as the first data, and the third data is different from the first data.

In the above solution, the apparatus further includes a receiving module. The receiving module is configured to receive a response message corresponding to the request message and returned by the second network element. The response message is used for indicating that the request message is accepted or rejected; where in response to determining that the response message indicates that the request message is accepted, the response message carries radio resource configuration information for the first secondary link; and in response to determining that the response message indicates that the request message is rejected, the response message carries information for indicating that establishing the first secondary link is rejected.

In the above solution, the apparatus further includes a processing module. The processing module is configured to: encapsulate the radio resource configuration information and generate RRC signaling toward the terminal in response to determining that the response message indicates that the request message is accepted; and send the generated RRC signaling to the terminal.

The embodiments of the present disclosure further provide a network element including a memory, a processor and computer programs stored in the memory and executable by the processor, where the processor implements the data transmission method described above through the computer programs.

The embodiments of the present disclosure further provide a storage medium including stored programs, where when executed, the programs implement the data transmission method described above.

The embodiments of the present disclosure further provide a processor, which is configured to execute programs, where when executed, the programs implement the data transmission method described above.

The embodiments of the present disclosure further provide a data transmission apparatus including a memory and a processor, where the memory is configured to store programs for data transmissions and the processor is configured to execute the programs, where when executed, the programs implement the data transmission method described above.

According to the embodiments of the present disclosure, since the first network element is configured with the anchor link of the radio bearer for the terminal, and the second network element is configured with the first secondary link and the second secondary link of the radio bearer for the terminal, compared with the related art in which the second network element is configured with only one secondary link, the present disclosure can better satisfy the QoS requirement of the terminal, solve the problem in the related art of the inability of the dual connectivity architecture to satisfy the QoS requirement of the terminal, and improve performance of communication services provided for the terminal.

DETAILED DESCRIPTION

The present disclosure will be described hereinafter in detail with reference to the drawings in conjunction with the embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Figure 2A:
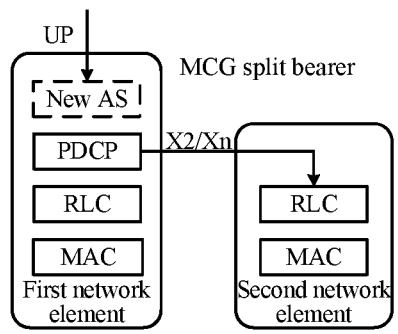
FIG. 2a is a schematic diagram 1 of a user plane bearer mode of a dual connectivity architecture in the related art.
Figure 2B:
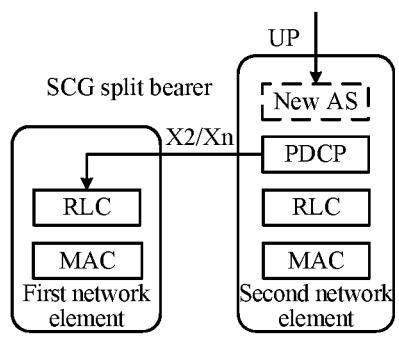
FIG. 2b is a schematic diagram 2 of a user plane bearer mode of a dual connectivity architecture in the related art.

Inventors have found during a research that in a DC architecture, an L2 protocol stack of a certain RB may be configured separately on two serving network elements. In an embodiment, FIG. 2a is a schematic diagram 1 of a user plane bearer mode of a dual connectivity architecture in the related art, and FIG. 2b is a schematic diagram 2 of a user plane bearer mode of the dual connectivity architecture in the related art. As shown in FIG. 2a and FIG. 2b, the RB is configured with two RLC entities and two MAC entities, the two RLC entities are independently located in the two serving network elements separately, and the two MAC entities are independently located in the two serving network elements separately, where when a UP interface is terminated at a first network element and a PDCP entity (in an embodiment, a new AS entity is further included) is located in the first network element, the RB is referred to as a master cell group (MCG) split bearer, and when the UP interface is terminated at a second network element and the PDCP entity (in an embodiment, the new AS entity is further included) is located in the second network element, the RB is referred to as a secondary cell group (SCG) split bearer. In the MCG/SCG split bearer, the PDCP entity transmits a generated PDCP protocol data unit (PDU) through the two RLC entities separately, that is, radio resources on two network elements are used for transmissions of one RB, thereby improving transmission throughput. In another aspect, when a radio channel quality of the first network element or the second network element drops slightly, the PDCP entity may also transmit the PDCP PDU only on a link with a good radio channel quality, thereby ensuring transmission reliability to a certain extent.

Figure 3:
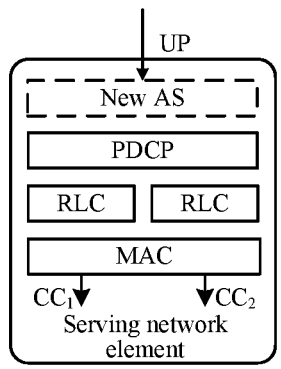
FIG. 3 is a schematic diagram of a duplication bearer mode in the related art.

In another aspect, a 5G system further introduces a UP bearer mode that is more capable of ensuring reliability. FIG. 3 is a schematic diagram of a duplication bearer mode in the related art. As shown in FIG. 3, a current serving network element of a UE may configure a certain RB with two independent RLC entities which are mapped to two different component carriers (CC) in a MAC entity. Furthermore, the PDCP entity duplicates the PDCP PDU to generate two identical PDCP PDUs and transmit the PDCP PDUs through two RLC entities and two CCs separately (this bearer mode may be referred to as a duplication bearer), that is, the PDCP PDUs containing the same content are transmitted on two radio links separately, thereby improving the transmission reliability.

Figure 4:
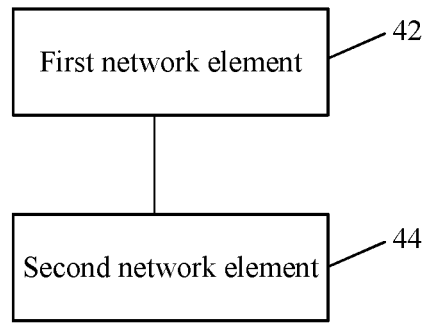
FIG. 4 is a block diagram of a system according to an embodiment of the present disclosure.

An embodiment of the present disclosure provides a data transmission system. FIG. 4 is a block diagram of a data transmission system according to an embodiment of the present disclosure. As shown in FIG. 4, the system includes a first network element 42 and a second network element 44. The first network element 42 is configured with an anchor link of a radio bearer for a terminal, and the second network element 44 is configured with a first secondary link and a second secondary link of the radio bearer. The anchor link includes a PDCP entity and a first RLC entity, the first secondary link includes a second RLC entity, and the second secondary link includes a third RLC entity, where a data transmission is performed between the PDCP entity and the first RLC entity, the second RLC entity and the third RLC entity.

In the above system, since the first network element 42 is configured with the anchor link of the radio bearer for the terminal, and the second network element 44 is configured with the first secondary link and the second secondary link of the radio bearer for the terminal. Compared with the related art in which the second network element 44 is configured with only one secondary link, the present disclosure can better satisfy a QoS requirement of the terminal, solve the problem in the related art of an inability of a dual connectivity architecture to satisfy the QoS requirement of the terminal, and improve performance of communication services provided for the terminal.

It is to be noted that the anchor link further includes a first MAC entity and/or a new AS entity. The second network element further includes a second MAC entity, the first secondary link further includes a first logical channel of the second MAC entity, and the second secondary link further includes a second logical channel of the second MAC entity.

In an embodiment of the present disclosure, when first data is transmitted between the PDCP entity and the first RLC entity, second data is transmitted between the PDCP entity and the second RLC entity, and third data is transmitted between the PDCP entity and the third RLC entity; where the second data is different from the first data, and the third data is the same as the first data; or the second data is the same as the first data, and the third data is different from the first data. Through the first secondary link and the second secondary link, transmission throughput and transmission reliability of the radio bearer can be improved.

It is to be noted that the second data is different from the first data, and the third data is the same as the first data, which includes that the first data is a PDCP PDU, the second data is a non-duplicated PDCP PDU, and the third data is a duplicated PDCP PDU (that is, data obtained by duplicating the PDCP PDU), but it is not limited thereto.

In an embodiment, the first network element is further configured with a third secondary link. The third secondary link includes a fourth RLC entity; where fourth data is transmitted between the PDCP entity and the fourth RLC entity, and the fourth data is the same as data transmitted between the PDCP entity and the first RLC entity. Data transmission reliability is further improved through this structure.

It is to be noted that when the first data is the PDCP PDU, the fourth data is the duplicated PDCP PDU, but it is not limited thereto.

Figure 1:
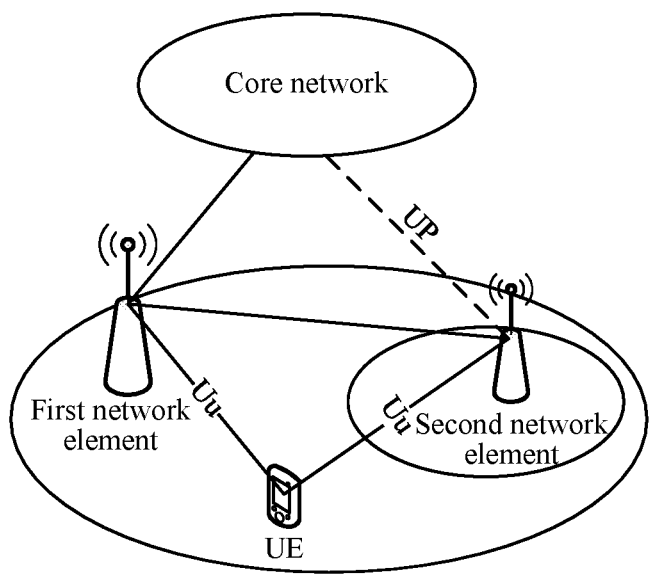
FIG. 1 is a schematic diagram of a dual connectivity architecture in the related art.
Figure 5:
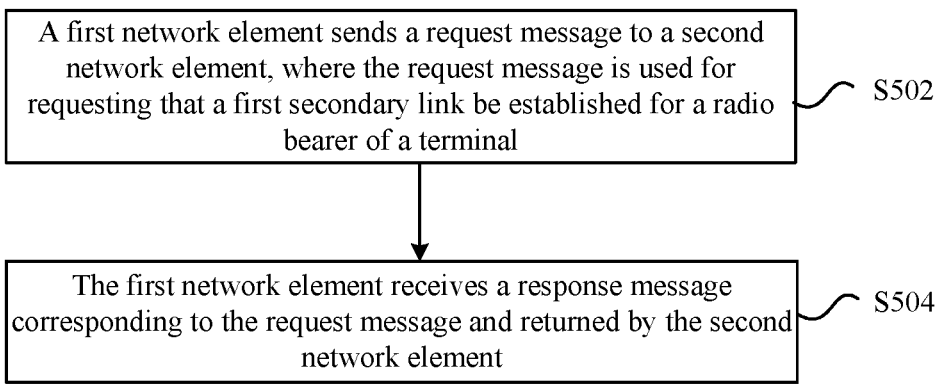
FIG. 5 is a flowchart of a data transmission method according to an embodiment of the present disclosure.

This embodiment provides a data transmission method executed on a network architecture shown in FIG. 1. FIG. 5 is a flowchart of a data transmission method according to an embodiment of the present disclosure. As shown in FIG. 5, the process of the method includes steps described below.

In step S502, a first network element sends a request message to a second network element, where the request message is used for requesting that a first secondary link be established for a radio bearer of a terminal.

Here, the first network element has been configured with an anchor link of the radio bearer, and the second network element has been configured with a second secondary link of the radio bearer. The anchor link includes a PDCP entity and a first RLC entity, the first secondary link includes a second RLC entity, and the second secondary link includes a third RLC entity, where a data transmission is performed between the PDCP entity and one of the first RLC entity, the second RLC entity or the third RLC entity.

In step S504, the first network element receives a response message corresponding to the request message and returned by the second network element.

Through the above steps, when the first network element has been configured with the anchor link of the radio bearer, and the second network element has been configured with the second secondary link of the radio bearer, the first network element sends the request message used for requesting that the first secondary link be established for the radio bearer of the terminal to the second network element, so that it is likely to establish another secondary link, namely first secondary link, in the second network element, and two secondary links may be established in the second network element. Compared with the related art in which the second network element is configured with only one secondary link, the present disclosure can better satisfy a QoS requirement of the terminal, solve the problem in the related art of an inability of a dual connectivity architecture to satisfy the QoS requirement of the terminal, and improve performance of communication services provided for the terminal.

It to be noted that step S502 may be performed individually or may be performed in combination with step S504, but it is not limited thereto.

It is to be noted that the anchor link further includes a first MAC entity and/or a new AS entity. The second network element further includes a second MAC entity, the first secondary link further includes a first logical channel of the second MAC entity, and the second secondary link further includes a second logical channel of the second MAC entity.

In an embodiment, when first data is transmitted between the PDCP entity and the first RLC entity, second data is transmitted between the PDCP entity and the second RLC entity, and third data is transmitted between the PDCP entity and the third RLC entity; where the second data is different from the first data, and the third data is the same as the first data; or the second data is the same as the first data, and the third data is different from the first data. Through the first secondary link and the second secondary link, transmission throughput and transmission reliability of the radio bearer can be improved.

In an embodiment, that the second data is different from the first data, and the third data is the same as the first data includes that the first data is a PDCP PDU, the second data is a non-duplicated PDCP PDU, and the third data is a duplicated PDCP PDU (that is, data obtained by duplicating the PDCP PDU), but it is not limited thereto.

In an embodiment, the request message carries the following information: an identifier of the terminal, an identifier of the radio bearer, or an architectural mode of the first secondary link.

In an embodiment, the request message further carries at least one of: a measurement result of the first network element on a cell of the second network element, QoS information of the radio bearer, an operation mode of the first secondary link, or a transport layer address and a port identifier which are assigned by the first network element for an interface transport tunnel between the first network element and the second network element.

In an embodiment, the response message is used for indicating that the request message is accepted or rejected, where when the response message indicates that the request message is accepted, the response message carries radio resource configuration information for the first secondary link; and when the response message indicates that the request message is rejected, the response message carries information for indicating that establishing the first secondary link is rejected.

In an embodiment, when the response message indicates that the request message is accepted, after step S504, the method may further include steps described below. The first network element encapsulates the radio resource configuration information and generates RRC signaling toward the terminal. The first network element sends the generated RRC signaling to the terminal.

It is to be noted that step S502 may be actively triggered by the first network element, and thus before step S502, the method may further includes a step described below. The first network element determines that the first secondary link needs to be established in the second network element for the radio bearer according to a current requirement of a network side and/or radio channel condition information. In addition, step S502 may also be passively triggered by the first network element, and thus before step S502, the method further includes a step described below. The first network element receives a first message sent by the second network element, where the first message is used for indicating that the first network element needs to establish the first secondary link in the second network element for the radio bearer.

In an embodiment, the first message may carry at least one of: information of a cell corresponding to the first secondary link, where the information of the cell includes identifier information of the cell and frequency point information of the cell.

In an embodiment, the information of the cell may further include at least one of: a measurement result of the cell, a radio channel quality of the cell or radio resource condition information of the cell, but it is not limited thereto.

In an embodiment, the first message may further carry at least one of: information on a current serving cell of the second network element for the terminal, a radio channel quality of a target cell of the second network element or radio resource condition information of the target cell of the second network element, but it is not limited thereto.

In an embodiment, when step S502 is passively triggered by the first network element, after the first network element receives the first message sent by the second network element, the method further includes a step described below. The first network element determines according to the first message that establishing the first secondary link is accepted or rejected.

It is to be noted that step S502 may be implemented as follows: when the first network element determines that establishing the first secondary link is accepted and the first message does not carry the radio resource configuration information for the first secondary link, the first network element sends the request message to the second network element, where the request message is further used for requesting the radio resource configuration information for the first secondary link. In this case, step S504 may continue to be performed.

It is to be noted that when the first network element determines that establishing the first secondary link is accepted and the first message carries the radio resource configuration information for the first secondary link, the method further includes steps described below. The first network element does not send the request message to the second network element, encapsulates the radio resource configuration information directly and generates the RRC signaling toward the terminal, and sends the generated RRC signaling to the terminal. In this case, step S502 may not be performed.

In an embodiment, before the first network element receives the first message sent by the second network element, the method further includes a step described below. The second network element determines that the first secondary link needs to be established in the second network element for the radio bearer.

In an embodiment, the step in which the second network element determines that the first secondary link needs to be established in the second network element for the radio bearer includes a step described below. The second network element determines that the first secondary link needs to be established in the second network element for the radio bearer according to at least one of the following information: current radio channel information between the second network element and the terminal, radio resource information of the second network element or information carried in a received second network element addition request message sent by the first network element.

In an embodiment, the information carried in the second network element addition request message may include at least one of: QoS information of the radio bearer or bearer mode information of the radio bearer, but it is not limited thereto.

In an embodiment, when the second network element has been configured with the first secondary link, the first network element may further deactivate or reactivate at least one secondary link to achieve coordination with the second network element. Taking that the first network element deactivates at least one secondary link as an example, the method may further include steps described below. The first network element receives indication information sent by the second network element, where the indication information indicates to deactivate a specified secondary link; and where the specified secondary link includes the first secondary link or the second secondary link. When the first network element determines that deactivating the specified secondary link is accepted, the first network element suspends or closes a data processing function of the PDCP entity corresponding to the specified secondary link.

In an embodiment, the data processing function may include a data duplication function and/or a data routing function, but it is not limited thereto.

In an embodiment, when the first network element determines that deactivating the specified secondary link is rejected, the first network sends rejection information indicating that the first network element rejects deactivating the specified secondary link to the second network element.

In an embodiment, the first network element sends the request message used for requesting that the first secondary link be established for the radio bearer of the terminal to the second network element in one of the following processes: a process of providing context information of the terminal for the second network element, a process for modifying the context information of the terminal on the second network element or a process for converting a role of the second network element.

From the description of the above-mentioned embodiments, it will be apparent to those skilled in the art that the method in the embodiments described above may be implemented by software plus a necessary general-purpose hardware platform, or may of course be implemented by hardware. However, in many cases, the former is a preferred implementation manner. Based on this understanding, the technical solution of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

This embodiment further provides a data transmission apparatus. The apparatus is configured to implement the above-mentioned embodiments, and what has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 6:
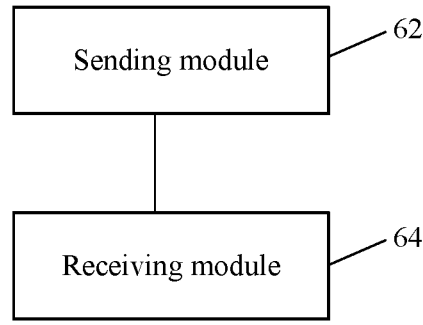
FIG. 6 is a block diagram of a data transmission apparatus according to an embodiment of the present disclosure.

FIG. 6 is a block diagram of a data transmission apparatus according to an embodiment of the present disclosure. The data transmission apparatus may be disposed in a first network element. As shown in FIG. 6, the apparatus includes a sending module 62 and a receiving module 64.

The sending module 62 is configured to send a request message to a second network element, where the request message is used for requesting that a first secondary link be established for a radio bearer of a terminal. The first network element has been configured with an anchor link of the radio bearer and the second network element has been configured with a second secondary link of the radio bearer. The anchor link includes a PDCP entity and a first RLC entity, the first secondary link includes a second RLC entity, and the second secondary link includes a third RLC entity, where a data transmission is performed between the PDCP entity and the first RLC entity, the second RLC entity and the third RLC entity.

The receiving module 64 is connected to the sending module 62, and is configured to receive a response message corresponding to the request message and returned by the second network element. The response message is used for indicating that the request message is accepted or rejected; where when the response message indicates that the request message is accepted, the response message carries radio resource configuration information for the first secondary link; and when the response message indicates that the request message is rejected, the response message carries information for indicating that establishing the first secondary link is rejected.

In the above apparatus, when the first network element has been configured with the anchor link of the radio bearer and the second network element has been configured with the second secondary link of the radio bearer, the sending module 62 sends the request message used for requesting that the first secondary link be established for the radio bearer of the terminal to the second network element, so that it is likely to establish another secondary link, namely the first secondary link, in the second network element, and two secondary links may be established in the second network element. Compared with the related art in which the second network element is configured with only one secondary link, the present disclosure can better satisfy a QoS requirement of the terminal, solve the problem in the related art of an inability of a dual connectivity architecture to satisfy the QoS requirement of the terminal, and improve performance of communication services provided for the terminal.

In an embodiment, the anchor link further includes a first MAC entity and/or a new AS entity. The second network element further includes a second MAC entity, the first secondary link further includes a first logical channel of the second MAC entity, and the second secondary link further includes a second logical channel of the second MAC entity.

In an embodiment, when first data is transmitted between the PDCP entity and the first RLC entity, second data is transmitted between the PDCP entity and the second RLC entity, and third data is transmitted between the PDCP entity and the third RLC entity; where the second data is different from the first data, and the third data is the same as the first data; or the second data is the same as the first data, and the third data is different from the first data. Through the first secondary link and the second secondary link, transmission throughput and transmission reliability of the radio bearer can be improved.

It is to be noted that the sending module 62 may be disposed individually or disposed together with the receiving module 64, but it is not limited thereto.

In an embodiment, that the second data is different from the first data, and the third data is the same as the first data includes that the first data is a PDCP PDU, the second data is a non-duplicated PDCP PDU, and the third data is a duplicated PDCP PDU (that is, data obtained by duplicating the PDCP PDU), but it is not limited thereto.

In an embodiment, the request message may carry the following information: an identifier of the terminal, an identifier of the radio bearer, or an architectural mode of the first secondary link.

In an embodiment, the request message may further carry at least one of: a measurement result of the first network element on a cell of the second network element, QoS information of the radio bearer, an operation mode of the first secondary link, or a transport layer address and a port identifier which are assigned by the first network element for an interface transport tunnel between the first network element and the second network element.

In an embodiment, the apparatus further includes a processing module. The processing module is connected to the receiving module 64, and is configured to: encapsulate the radio resource configuration information and generate RRC signaling toward the terminal when the response message indicates that the request message is accepted; and send the generated RRC signaling to the terminal.

It is to be noted that the request message may be actively or passively sent by the sending module 62. When the request message is actively sent by the sending module 62, the apparatus may further include a first determining module. The first determining module is connected to the sending module 62, and is configured to determine that the first secondary link needs to be established in the second network element for the radio bearer according to a current requirement of a network side and/or radio channel condition information. When the request message is passively sent by the sending module 62, the receiving module 64 may be further configured to receive a first message sent by the second network element, where the first message indicates that the first network element needs to establish the first secondary link in the second network element for the radio bearer.

In an embodiment, the first message may carry at least one of: information of a cell corresponding to the first secondary link, where the information of the cell includes identifier information of the cell and frequency point information of the cell.

In an embodiment, the information of the cell may further include at least one of: a measurement result of the cell, a radio channel quality of the cell or radio resource condition information of the cell, but it is not limited thereto.

In an embodiment, the first message may further carry at least one of: information on a current serving cell of the second network element for the terminal, a radio channel quality of a target cell of the second network element or radio resource condition information of the target cell of the second network element, but it is not limited thereto.

In an embodiment, the apparatus may further include a second determining module, which is configured to determine, according to the first message, to accept or reject establishing the first secondary link after the receiving module 64 receives the first message sent by the second network element.

It is to be noted that when the second determining module determines that establishing the first secondary link is accepted and the first message does not carry the radio resource configuration information for the first secondary link, the sending module 62 is configured to send the request message to the second network element, where the request message is further used for requesting the radio resource configuration information for the first secondary link.

It is to be noted that when the second determining module determines that establishing the first secondary link is accepted and the first message carries the radio resource configuration information for the first secondary link, the sending module 62 does not send the request message to the second network element, and the processing module directly encapsulates the radio resource configuration information, generates the RRC signaling toward the terminal, and sends the generated RRC signaling to the terminal.

It to be noted that the second network element may determine that the first secondary link needs to be established in the second network element for the radio bearer. In an embodiment, the step in which the second network element determines that the first secondary link needs to be established in the second network element for the radio bearer includes a step described below. The second network element determines that the first secondary link needs to be established in the second network element for the radio bearer according to at least one of: current radio channel information between the second network element and the terminal, radio resource information of the second network element or information carried in a received second network element addition request message sent by the first network element. It is to be noted that the information carried in the second network element addition request message may include at least one of: QoS information of the radio bearer or bearer mode information of the radio bearer, but it is not limited thereto.

In an embodiment, when the second network element has been configured with the first secondary link, the first network element may further deactivate or reactivate at least one secondary link to achieve coordination with the second network element. Taking that the first network element deactivates at least one secondary link as an example, the receiving module 64 may be further configured to receive indication information sent by the second network element, where the indication information indicates to deactivate a specified secondary link; where the specified secondary link includes the first secondary link or the second secondary link. When it is determined to accept deactivating the specified secondary link, the processing module is further configured to suspend or close a data processing function of the PDCP entity corresponding to the specified secondary link.

It is to be noted that the data processing function may include a data duplication function and/or a data routing function, but it is not limited thereto.

In an embodiment, the sending module 62 may be further configured to: when it is determined to reject deactivating the specified secondary link, send rejection information indicating that the first network element rejects deactivating the specified secondary link to the second network element.

In an embodiment, the sending module 62 sends the request message used for requesting that the first secondary link be established for the radio bearer of the terminal to the second network element in one of the following processes: a process of providing context information of the terminal for the second network element, a process for modifying the context information of the terminal on the second network element or a process for converting a role of the second network element.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

An embodiment of the present disclosure further provides a network element, which may be a first network element. The network element includes a memory, a processor, and computer programs stored in the memory and executable by the processor, where the processor implements the data transmission method described above through the computer programs.

An embodiment of the present disclosure further provides a storage medium including stored programs, where when executed, the programs implement the data transmission method described above.

The storage medium may include, but is not limited to, a USB disk, a ROM, a RAM, a mobile hard disk, a magnetic disk, an optical disk or another medium capable of storing program codes.

An embodiment of the present disclosure further provides a processor, which is configured to execute programs, where when executed, the programs implement steps of the data transmission method described above.

Figure 7:
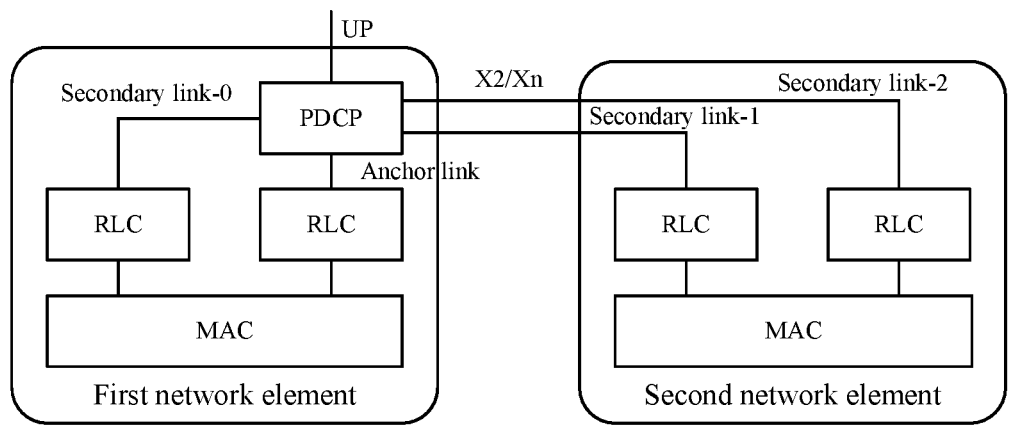
FIG. 7 is a schematic diagram of a UP architectural mode according to an embodiment of the present disclosure.

FIG. 7 is a schematic diagram of a UP architectural mode according to an embodiment of the present disclosure. As shown in FIG. 7 (a new AS entity is temporarily omitted in FIG. 7), a radio bearer is mandatorily configured with a complete set of L2 protocol entities, so as to perform basic data transmissions. In an embodiment, the RB is configured with at least one set of secondary protocol entities to enhance transmission performance. In this embodiment, the complete set of L2 protocol entities (and corresponding physical transport channel) is referred to as an anchor link (AL) of the RB, and the AL may be disposed in a first network element (as shown in FIG. 4) or a second network element.

In this embodiment, the secondary protocol entities (that is, a radio protocol stack without a PDCP entity, and including an RLC entity, a component carrier in a MAC entity, and corresponding physical transport channel) are referred to as a secondary link (SL) of the RB. Furthermore, according to a position and an effect on data transmissions of the secondary protocol entities of the secondary link, the SL includes at least three forms (from the perspective of a network side) described below.

When the secondary protocol entities and the corresponding PDCP entity are disposed in a same network element (for example, the first network element), generally, the SL transmits a duplicated PDCP PDU to mainly improve data transmission reliability. For clarity of description, the secondary link with this form and effect is labeled as SL0 in this embodiment (equivalent to a third secondary link in the above-mentioned embodiments).

It is to be noted that the SL0 may also transmit a non-duplicated PDCP PDU to improve transmission throughput of the RB; that is, the secondary protocol entities transmit only the PDCP PDU. A form of the PDCP PDU (that is, an effect of the SL0) is determined by a radio resource management (RRM) function of the first network element.

When the secondary protocol entities and the corresponding PDCP entity are disposed in different network elements (for example, the second network element), the non-duplicated PDCP PDU is transmitted between the PDCP entity and the RLC entity (that is, different PDCP PDUs are transmitted by the SL and the AL), that is, the effect of the SL is mainly to improve the transmission throughput of the RB. For clarity of description, the SL with this form and effect is labeled as SL1 in this application.

When the secondary protocol entities and the corresponding PDCP entity are disposed in different network elements (for example, the second network element), the duplicated PDCP PDU is transmitted between the PDCP entity and the RLC entity (that is, a same PDCP PDU is transmitted by the SL and the AL), that is, the effect of the SL is mainly to improve the transmission reliability of the RB. For clarity of description, the SL with this form and effect is labeled as SL2 in this application.

It is to be noted that a first secondary link in the above-mentioned embodiments may be the SL1 or the SL2, but it is not limited thereto; a second secondary link in the above-mentioned embodiments may be the SL1 or the SL2, but it is not limited thereto. In an embodiment, the first secondary link is different from the second secondary link.

A system architecture on which the UP architectural mode is based may refer to the description of FIG. 1, and in this embodiment, a core network, the first/second network element, and types, numbers and techniques used of wired/wireless interfaces are not limited.

In this embodiment, a form of a transmission packet (that is, the effect) of the SL0 and even whether the SL0 is configured are not limited in this embodiment. This embodiment mainly focuses on how to achieve configurations of the SL1 and the SL2.

A CP solution in this embodiment is described below.

For a certain RB of a UE (for example, the PDCP entity of the RB is located in the first network element, and whether to establish the SL0 is not limited), the first network element decides to establish the SL1 or the SL2, where the decision may be a direct decision made when the first network element performs the radio resource management or an indirect decision made according to a request for the SL1 or SL2 of the second network element.

The first network element may send a request message through an X2/Xn interface to the second network element according to requirements of the RB on the transmission throughput or reliability (part of a QoS requirement of the RB), a current radio environment of the UE acquired by the first network element and the like, where the request message is used for requesting the second network element to provide radio resources to establish a secondary link satisfying the QoS requirement of the RB. In an embodiment, the request message carries at least: an identifier of the UE, an identifier of the RB corresponding to the SL1 or the SL2 and an architectural mode of the SL1 or the SL2 (that is, in a radio protocol stack that the second network element needs to establish, the configuration of the SL1 or the SL2 do not need to include the PDCP entity and a protocol entity above the PDCP entity).

In an embodiment, the request message may further carry a measurement result of the first network element on a cell of the second network element, the QoS requirement of the RB, an operation mode of the SL1 or the SL2, and a transport layer address and a port identifier which are assigned by the first network element for an X2/Xn user plane interface transport tunnel.

The request message may occur in a second network element addition procedure, a second network element modification process or a second network element switching process.

The second network element decides whether to establish a secondary link in the form of the SL1 or the SL2 for the RB of the UE, where the decision may be a direct decision made when the second network element performs the radio resource management or an indirect decision made according to the request message from the first network element. A premise for the direct decision is that the SL1 or the SL2 has been established for the RB of the UE on a second network element side, but with changes of the radio environment and the like, the second network element thinks that only the SL1 or the SL2 cannot satisfy the QoS requirement of the RB currently, and another one secondary link in the form of the SL1 or the SL2 needs to be established. For the indirect decision, enough radio resources may exist on the second network element side, but the radio resources are distributed on two cells of the second network element, and it is difficult to satisfy the QoS requirement of the RB with one secondary link.

A response message sent or returned by the second network element through the X2/Xn interface to the first network element may indicate that a request of the first network element for establishing the SL1 or the SL2 is accepted, or suggest on the basis of the request of the first network element that two secondary links be established to jointly satisfy the QoS requirement of the RB. The response message may carry radio resource configuration information for the SL1 and/or the SL2 of the second network element and cell information of an additional secondary link that the second network element suggests adding.

Alternatively, the response message through the X2/Xn interface may also indicate that the request of the first network element is rejected. In an embodiment, the response message may also carry a rejection cause value.

When the SL1 and/or the SL2 has been established, the second network element may decide to deactivate at least one of the SL1 or the SL2, and indicate deactivation information to the UE and the first network element through a wireless interface and the X2/Xn interface respectively. The second network element indicates the deactivation information through a MAC CE on the wireless interface and may indicate the deactivation information through CP information or UP information on the X2/Xn interface.

After the first network element receives deactivation indication information, the first network element may decide to accept or reject the information, and accordingly close or maintain routing and packet duplication functions of the PDCP entity corresponding to the SL1 and/or the SL2. In an embodiment, the first network element returns acceptance or rejection information for a deactivation indication through the X2/Xn interface to the second network element.

It is to be noted that functions of the first network element are partly or completely the same as functions of the first network element in the embodiments described above, and functions of the second network element are partly or completely the same as functions of the second network element in the embodiments described above.

Under the system architecture in this embodiment, based on the CP solution, configurations of various UP bearer modes can be flexibly achieved and efficient and reliable data transmissions can be achieved, thereby improving communication experience of a user; and no excessive signaling loads are introduced on the CP, and protocol and product implementations are simple.

Figure 8:
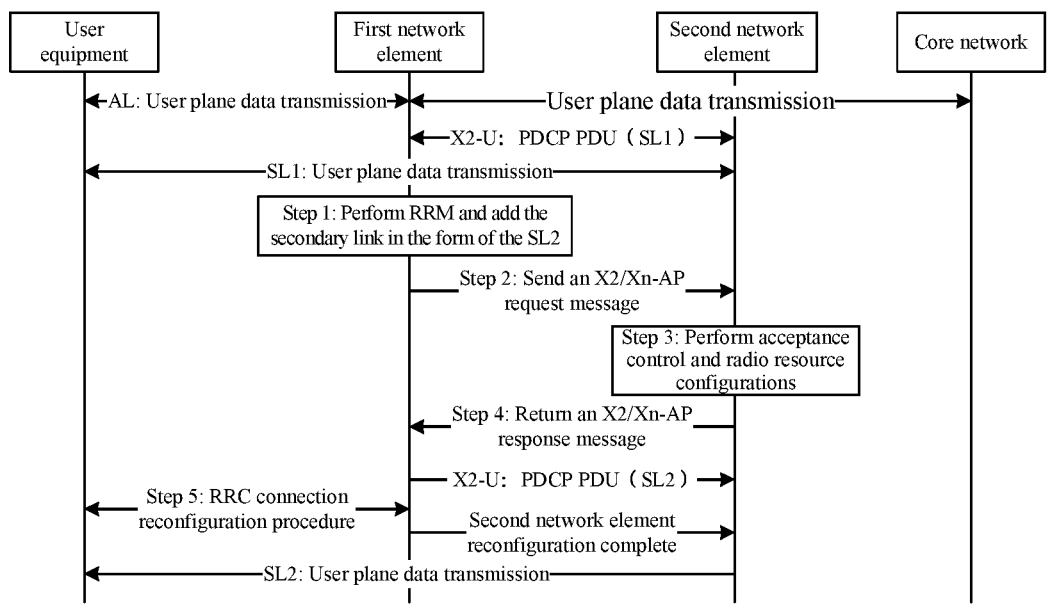
FIG. 8 is a flowchart of a data transmission method according to an embodiment of the present disclosure.

For at least one radio bearer of the UE, currently the first network element and the second network element have configured two radio links (such as the AL and the SL1) for the radio bearer to perform data transmissions. The first network element performs the radio resource management and decides to add another secondary link for the RB to improve transmission reliability on the wireless interface. FIG. 8 is a flowchart of a data transmission method according to an embodiment of the present disclosure. Steps are described below.

In step 1, the first network element performs the RRM and adds the secondary link in the form of the SL2.

The first network element and the second network element currently provide communication services for the UE in the form of a DC architecture (refer to the description of the DC architecture in the background). In the DC architecture, a UP mode of at least one RB of the UE is configured as a mode in which the AL and the SL1 are combined for transmissions (refer to an MCG split bearer described in the background).

The first network element performs the radio resource management and decides to add another secondary link for the RB according to a current requirement of a network side and/or a radio channel condition to improve the transmission reliability, that is, the secondary link in the form of the SL2 is added. The decision may be made since a current channel condition of the AL and/or the SL1 is insufficient to satisfy a transmission reliability requirement of the RB and/or the RB has a higher transmission reliability requirement (according to indication information of the core network), etc.

In step 2, the first network element sends an X2/Xn-AP request message to the second network element.

The first network element sends the X2/Xn-AP request message to the second network element through the X2/Xn interface, where the X2/Xn-AP request message is used for requesting the second network element to provide radio resources for the RB of the UE to perform secondary link (SL2) transmissions satisfying the reliability requirement.

The X2/Xn-AP request message may be a second network element (SN) modification request message and carries at least the identifier of the UE, the identifier of the RB corresponding to the SL2 and the architectural mode of the SL2 (that is, in the radio protocol stack, the configuration of the SL2 does not need to include the PDCP entity and the protocol entity above the PDCP entity).

In an embodiment, the X2/Xn-AP request message may further carry at least one of: the measurement result of a first network element side on the cell of the second network element (a serving cell and/or a neighboring cell on the second network element side), the reliability requirement of the RB (an updated reliability requirement indicated by the core network), the operation mode of the SL2 (such as duplication, and duplication of the Al or the SL1 which may be further indicated), or the transport layer address and the port identifier which are assigned by the first network element for the X2/Xn user plane interface transport tunnel (if the SL2 also supports uplink data transmissions).

In step 3, the second network element performs acceptance control and radio resource configurations.

The second network element determines whether to agree to accept the request of the first network element according to received information. If a current radio resource condition of the second network element may satisfy a requirement for establishing the SL2, the second network element determines to agree to the request of the first network element, or otherwise the second network element determines to reject the request of the first network element.

When the second network element agrees to the request of the first network element, the second network element performs the radio resource configurations for the SL2 and generates the radio resource configuration information corresponding to the SL2. In an embodiment, the radio resource configuration information for the SL2 includes at least a configuration parameter of an RLC entity corresponding to the SL2, a configuration parameter of a CC corresponding to the SL2 in the MAC entity, a configuration parameter of a physical transport channel and the transport layer address and the port identifier which are assigned by the second network element for the X2/Xn user plane interface transport tunnel (used for transmitting a downlink PDCP PDU of the SL2).

For example, if the SL2 transmits the duplicated PDCP PDU for the AL, a logical channel priority of the SL2 in the MAC entity in the second network element should be the same as a logical channel priority of the AL in a MAC entity in the first network element.

In step 4, the second network element returns an X2/Xn-AP response message to the first network element through the X2/Xn interface.

The X2/Xn-AP response message, such as a SN modification response message, carries at least the radio resource configuration information for the SL2.

If the second network element determines to reject the request of the first network element, the X2/Xn-AP response message carries information indicating that establishing the SL2 is rejected. In an embodiment, the X2/Xn-AP response message may also carry the rejection cause value.

In step 5, an RRC connection reconfiguration procedure is performed.

The first network element encapsulates received radio resource configuration information for the SL2 and generates RRC signaling toward the UE, such as an RRC connection reconfiguration message, and sends the RRC signaling to the UE through the wireless interface. In another aspect, the PDCP entity in the first network element enables the packet duplication function (if it is not enabled before) and sends the generated duplicated packet (the duplicated packet may be obtained by duplicating a PDCP PDU which is transmitted by the AL or may be obtained by duplicating a PDCP PDU which is transmitted by the SL1) to the second network element through an established X2/Xn user plane transport tunnel.

After receiving an RRC connection reconfiguration complete message returned by the UE, the first network element sends an X2/Xn-AP confirm message (such as a second network element reconfiguration complete message) to the second network element to confirm a success of the radio resource configurations for the SL2 to the second network element. After the second network element receives the X2/Xn-AP confirm message, the second network element begins to send the duplicated packet received through the user plane transport tunnel to the UE through the SL2 via the wireless interface.

It is to be noted that the first network element may transmit the duplicated packet to the second network element as early as the first network element receives the X2/Xn-AP response message. Data transmission time on the network side does not affect control plane programs of the present disclosure.

Figure 9:
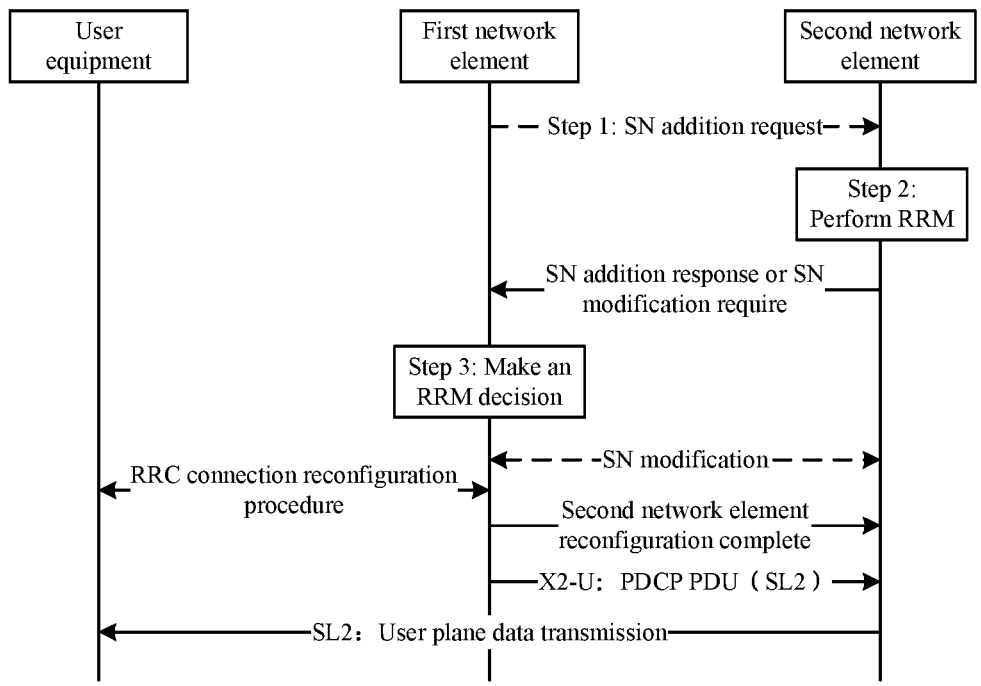
FIG. 9 is a flowchart of a data transmission method according to an embodiment of the present disclosure.

For a certain RB of the UE, when the reliability requirement indicated by the first network element cannot be satisfied, the second network element may suggest establishing another secondary link for the RB on the second network element side to improve the transmission reliability on the wireless interface. FIG. 9 is a flowchart of a data transmission method according to an embodiment of the present disclosure. Steps are described below.

In step 1, the first network element sends a second network element addition request to the second network element.

This step occurs only in a second network element addition procedure. The first network element selects an appropriate base station for the UE as the second network element according to the requirement of the network side and the current radio environment condition, and sends an SN addition request message to the second network element through the X2/Xn interface, where the SN addition request message carries the same information as that in the existing art. For example, the carried information includes QoS information of the RB that the first network element requests the second network element to establish the secondary link for the UE and bearer mode information of the RB (MCG split bearer). The QoS information includes information on the reliability requirement of the RB.

In step 2, the second network element performs the RRM.

The RRM may be for a current radio channel condition between the second network element and the UE (that is, a scenario in which the SL1 has been established between the second network element and the UE) and/or a radio resource condition on the second network element side, or may be for information carried in the SN addition request message sent by the first network element (that is, the second network element addition procedure, following step 1).

Accordingly, the RRM is for the following: a current serving link (SL1) between the second network element and the UE, or a target cell of the second network element that is requested to be added by the first network element in the SN addition request message, and the second network element determines that the reliability requirement of the RB is difficult to satisfy. However, at the same time, the second network element has another cell (that is, neither a serving cell nor the target cell of the second network element) which can simultaneously provide secondary services for the UE. It is to be noted that if the RRM is currently for the second network element addition procedure, the conclusion is provided on the premise that the first network element provides a radio signal measurement result of another cell other than the target cell of the second network element in the SN addition request message.

After obtaining a radio resource management decision, the second network element sends an X2/Xn-AP message to the first network element. The X2/Xn-AP message may be an SN modification require message triggered by the second network element or may be a response message returned for the SN addition request message, that is, an SN addition response message. The X2/Xn-AP message may be sent to suggest to the first network element that another secondary link in the form of the SL2 be established for the RB on the second network element side. In an embodiment, the suggestion may be explicitly indicated by indication information or implicitly indicated by information such as a cell measurement result. No matter whether the suggestion is explicitly or implicitly indicated, the X2/Xn-AP message may include information that the second network element is capable of establishing a cell of the SL2. The information of the cell includes basic information such as an identifier and a frequency point of the cell, and information such as a radio channel quality and/or a radio resource condition. In an embodiment, the X2/Xn-AP message may further carry a current serving cell of the second network element for the UE or a radio channel quality and/or radio resource condition information of the target cell of the second network element.

In an embodiment, the radio resource configuration information for the SL2 of the second network element may be directly carried in the X2/Xn-AP message. In the second network element addition procedure, radio resource configuration information for the SL1 of the second network element may be further carried in the X2/Xn-AP message.

In step 3, the first network element makes an RRM decision.

Here, the first network element makes the radio resource management decision according to the received X2/Xn-AP message. The RRM decision includes acceptance or rejection of the suggestion of the second network element that the SL2 be established. If the first network element decides to reject the suggestion, the first network element may also make other RRM decisions which include, but are not limited to, releasing or switching the second network element.

If the first network element decides to accept the suggestion, the first network element may encapsulate the radio resource configuration information for the SL2 (in an embodiment, the radio resource configuration information for the SL1 is further included) and generate the RRC signaling toward the UE. If the radio resource configuration information for the SL2 is not carried in the X2/Xn-AP message, the first network element needs to request the radio resource configuration information for the SL2 from the second network element (through a second network element modification procedure, which may refer to the description of the embodiment 1).

Subsequent RRC signaling procedure and second network element with the X2/Xn interface reconfiguration confirm procedure, a data transmission procedure and the like may refer to the description of step 4 in the embodiment 1, which is not repeated in this example.

Figure 10:
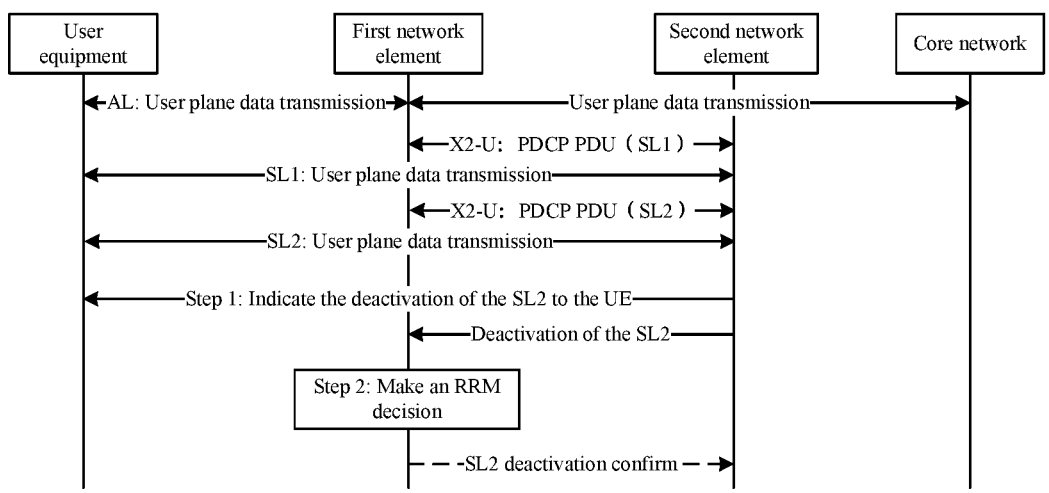
FIG. 10 is a flowchart of a data transmission method according to an embodiment of the present disclosure.

During the second network element provides communication services for the UE in the architectural mode of SL2, the second network element performs the radio resource management and decides to deactivate the SL2. The second network element notifies the UE and the first network element of a deactivation indication separately. FIG. 10 is a flowchart of a data transmission method according to an embodiment of the present disclosure. Steps are described below.

In step 1, the second network element indicates deactivation of the SL2 to the UE.

This embodiment is described by taking the deactivation of the SL2 as an example, but the deactivation may also be performed on the SL1. In the DC architecture, the first network element and the second network element provide the communication services for the UE through three radio links, the AL, the SL1 and the SL2. The second network element may decide to suspend the data transmission on the SL2, that is, de-active the SL2, according to the current radio channel condition and the like of the SL2.

On the wireless interface, the second network element notifies the UE of the deactivation indication for the SL2 through a control plane control element (CE) of a MAC protocol sub-layer. On the X2/Xn interface, the second network element notifies the first network element of the deactivation indication for the SL2 through the control plane or user plane information. The indication information on the X2/Xn interface may also include a deactivation cause value, which includes, but is not limited to, the following: (1) the current radio channel quality of the SL2 drops to a certain threshold, or (2) the second network element thinks that radio link transmissions after the deactivation of the SL2 may satisfy the reliability requirement of the RB.

A sending order of the MAC CE and X2/Xn information is not limited, and for example, may be determined by the second network element. Sending time of the MAC CE is not limited, and for example, the MAC CE may be sent after all data packets in a buffer area of the RLC entity of the SL2 (or the buffer area corresponding to the SL2 in the MAC entity) have been sent.

In step 2, the first network element makes the RRM decision.

After the first network element receives the deactivation indication, if the first network element determines to accept the deactivation indication, the first network element suspends or closes the packet duplication function corresponding to the SL2 of the PDCP entity of the RB. In an embodiment, the first network element notifies the second network element of deactivation indication confirmation through the control plane or user plane information on the X2/Xn interface. In this case, when the second network element determines that the condition is allowed and the SL2 is needed, the SL2 may be re-active and the reactivation of the SL2 may be indicated through the wireless interface and the X2/Xn interface separately (similar to the de-activation of the SL2).

The first network element may also decide to reject the deactivation indication from the second network element. The rejection includes two cases described below. One case is that the current deactivation indication of the SL2 from the second network element is only rejected (for example, the deactivation cause value indicated by the second network element is (2)), so that the first network element indicates that an activated state of the SL2 still needs to be maintained in a returned X2/Xn interface message and continues maintaining the packet duplication function corresponding to the SL2 of the PDCP entity of the RB. The other case is that the first network element decides to switch a master serving cell of the second network element, or switch the second network element, or release the second network element (for example, the deactivation cause value indicated by the second network element is (1)), where a procedure for switching/releasing the second network element is the same as that in the existing art.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only specific embodiments of the present disclosure and are not intended to limit the present disclosure, and for those skilled in the art, the present disclosure may have various modifications and variations. Any modifications, equivalent substitutions, improvements and the like made within the principle of the present disclosure should fall within the scope of the present disclosure.

What is claimed is:

1. A data transmission system, comprising a first network element and a second network element;
   wherein the first network element is configured with an anchor link of a radio bearer for a terminal, and the second network element is configured with a first secondary link and a second secondary link of the radio bearer;
   wherein the anchor link comprises a packet data convergence protocol (PDCP) entity and a first radio link control (RLC) entity, the first secondary link comprises a second RLC entity, and the second secondary link comprises a third RLC entity;
   wherein a data transmission is performed between the PDCP entity and the first RLC entity, the second RLC entity and the third RLC entity; and
   wherein in response to determining that first data is transmitted between the PDCP entity and the first RLC entity, second data is transmitted between the PDCP entity and the second RLC entity, and third data is transmitted between the PDCP entity and the third RLC entity; wherein the second data is different from the first data, and the third data is the same as the first data; or the second data is the same as the first data and the third data is different from the first data.

2. The system of claim 1, wherein the first network element is further configured with a third secondary link;

wherein the third secondary link comprises a fourth RLC entity; wherein fourth data is transmitted between the PDCP entity and the fourth RLC entity, and the fourth data is the same as data transmitted between the PDCP entity and the first RLC entity.

3. A data transmission method, comprising:

sending, by a first network element, a request message to a second network element, wherein the request message is used for requesting that a first secondary link be established for a radio bearer of a terminal;

wherein the first network element is configured with an anchor link of the radio bearer, and the second network element is configured with a second secondary link of the radio bearer;

wherein the anchor link comprises a packet data convergence protocol (PDCP) entity and a first radio link control (RLC) entity, the first secondary link comprises a second RLC entity, and the second secondary link comprises a third RLC entity; wherein a data transmission is performed between the PDCP entity and one of the first RLC entity, the second RLC entity or the third RLC entity; and wherein in response to determining that first data is transmitted between the PDCP entity and the first RLC entity, second data is transmitted between the PDCP entity and the second RLC entity, and third data is transmitted between the PDCP entity and the third RLC entity;

wherein the second data is different from the first data, and the third data is the same as the first data;

or the second data is the same as the first data and the third data is different from the first data.

4. The method of claim 3, wherein the request message carries following information: an identifier of the terminal, an identifier of the radio bearer, or an architectural mode of the first secondary link.

5. The method of claim 4, wherein the request message further carries at least one of:

a measurement result of the first network element on a cell of the second network element, quality of service (QoS) information of the radio bearer, an operation mode of the first secondary link, or a transport layer address and a port identifier which are assigned by the first network element for an interface transport tunnel between the first network element and the second network element.

6. The method of claim 3, wherein after the first network element sends the request message to the second network element, the method further comprises:

receiving, by the first network element, a response message corresponding to the request message and returned by the second network element, wherein the response message is used for indicating that the request message is accepted or rejected;

wherein in response to determining that the response message indicates that the request message is accepted, the response message carries radio resource configuration information for the first secondary link; and in response to determining that the response message indicates that the request message is rejected, the response message carries information for indicating that establishing the first secondary link is rejected.

7. The method of claim 6, wherein in response to determining that the response message indicates the request message is accepted, after the first network element receives the response message corresponding to the request message and returned by the second network element, the method further comprises:

the first network element encapsulating the radio resource configuration information and generating radio resource control (RRC) signaling toward the terminal; and the first network element sending the generated RRC signaling to the terminal.

8. The method of claim 3, wherein before the first network element sends the request message to the second network element, the method further comprises:

determining, by the first network element, that the first secondary link needs to be established in the second network element for the radio bearer according to a current requirement of a network side and/or radio channel condition information; or receiving, by the first network element, a first message sent by the second network element, wherein the first message indicates that the first network element needs to establish the first secondary link in the second network element for the radio bearer.

9. The method of claim 8, wherein the first message carries information of a cell corresponding to the first secondary link; and wherein the information of the cell comprises: identifier information of the cell and frequency point information of the cell.

10. The method of claim 8, wherein after the first network element receives the first message sent by the second network element, the method further comprises:

determining, by the first network element according to the first message, that establishing the first secondary link is accepted or rejected.

11. The method of claim 10, wherein sending, by the first network element, the request message to the second network element comprises:

in response to determining by the first network element that the establishing the first secondary link is accepted and in response to determining that the first message does not carry radio resource configuration information for the first secondary link, sending, by the first network element, the request message to the second network element;

wherein the request message is further used for requesting the radio resource configuration information for the first secondary link.

12. The method of claim 10, wherein in response to determining by the first network element that the establishing the first secondary link is accepted and in response to determining that the first message carries radio resource configuration information for the first secondary link, the method further comprises:

without sending the request message to the second network element, the first network element encapsulating the radio resource configuration information directly and generating RRC signaling toward the terminal, and sending the generated RRC signaling to the terminal.

13. The method of claim 3, wherein in response to determining that the second network element has been configured with the first secondary link, the method further comprises:
receiving, by the first network element, indication information sent by the second network element, wherein the indication information indicates to deactivate a specified secondary link, and wherein the specified secondary link comprises the first secondary link or the second secondary link; and
in response to determining by the first network element that deactivating the specified secondary link is accepted, suspending or closing, by the first network element, a data processing function of the PDCP entity corresponding to the specified secondary link.

14. The method of claim 13, wherein in response to determining by the first network element that deactivating the specified secondary link is rejected, the first network sends rejection information indicating that the first network element rejects deactivating the specified secondary link to the second network element.

15. The method of claim 8, wherein before the first network element receives the first message sent by the second network element, the method further comprises:
determining, by the second network element, that the first secondary link needs to be established in the second network element for the radio bearer.

16. The method of claim 15, wherein the second network element determines that the first secondary link needs to be established in the second network element for the radio bearer comprises:
determining, by the second network element, that the first secondary link needs to be established in the second network element for the radio bearer according to at least one of following information:
current radio channel information between the second network element and the terminal, radio resource information of the second network element, or information carried in a received second network element addition request message sent by the first network element.

17. The method of claim 3, wherein the first network element sends the request message to the second network element in one of the following processes:
a process of providing context information of the terminal for the second network element, a process for modifying the context information of the terminal on the second network element, or a process for converting a role of the second network element.

18. A network element, comprising a memory, a processor and computer programs stored in the memory and executable by the processor;
wherein the network element serves as a first network element, the processor is configured to execute the computer programs, and when executed, the computer programs are configured to perform the following steps:
sending a request message to a second network element, wherein the request message is used for requesting that a first secondary link be established for a radio bearer of a terminal;
wherein the first network element is configured with an anchor link of the radio bearer, and the second network element is configured with a second secondary link of the radio bearer;
wherein the anchor link comprises a packet data convergence protocol (PDCP) entity and a first radio link control (RLC) entity, the first secondary link comprises a second RLC entity, and the second secondary link comprises a third RLC entity; wherein a data transmission is performed between the PDCP entity and one of the first RLC entity, the second RLC entity or the third RLC entity; and
wherein in response to determining that first data is transmitted between the PDCP entity and the first RLC entity, second data is transmitted between the PDCP entity and the second RLC entity, and third data is transmitted between the PDCP entity and the third RLC entity;
wherein
the second data is different from the first data, and the third data is the same as the first data;
or
the second data is the same as the first data, and the third data is different from the first data.

* * * * *